United States Patent [19]

Tucek

[11] 4,039,010

[45] Aug. 2, 1977

[54] HYDRAULIC CIRCUIT FOR TREE HARVESTING IMPLEMENT

[75] Inventor: Frank J. Tucek, Wausau, Wis.

[73] Assignee: J. I. Case Company, Racine, Wis.

[21] Appl. No.: 628,226

[22] Filed: Nov. 3, 1975

[51] Int. Cl.² .................... A01G 23/08; F15B 11/20
[52] U.S. Cl. ........................ 144/34 R; 60/421;
 91/29; 91/411 R; 91/412; 144/309 AC
[58] Field of Search .................. 91/411, 412, 29, 437;
 60/421; 144/2 Z, 3 D, 34 R, 34 E, 309 AC

[56] References Cited

U.S. PATENT DOCUMENTS

| 1,103,036 | 7/1914 | Clark | 91/29 |
|---|---|---|---|
| 2,101,021 | 12/1937 | Daly | 91/29 X |
| 3,313,316 | 4/1967 | Thomas | 91/411 R |
| 3,730,207 | 5/1973 | Christensen | 91/437 X |
| 3,774,696 | 11/1973 | Horsch | 91/412 X |
| 3,848,648 | 11/1974 | Dika et al. | 144/34 E |
| 3,902,538 | 9/1975 | Muirhead | 144/34 R |
| 3,922,855 | 12/1975 | Bridwell | 60/421 |

*Primary Examiner*—Irwin C. Cohen
*Attorney, Agent, or Firm*—Dressler, Goldsmith, Clement, Gordon & Shore, Ltd.

[57] ABSTRACT

A hydraulic circuit for a tree harvesting implement having a cutter mounted on a movable frame with a hydraulic ram moving the frame and a hydraulic motor driving the cutter is disclosed herein. The hydraulic circuit includes two separate pressurized fluid sources with one source connected to one end of the fluid ram and the second source connected to the hydraulic motor as well as the opposite end of the fluid ram with both conduit means having pressure relief valves that are settable so that the frame is moved as a function of the resistance encountered by the cutter and/or the movable frame.

11 Claims, 6 Drawing Figures

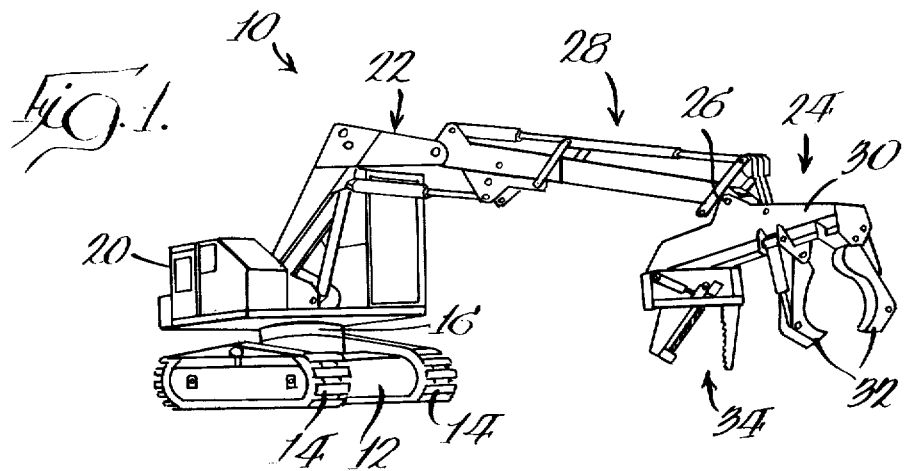
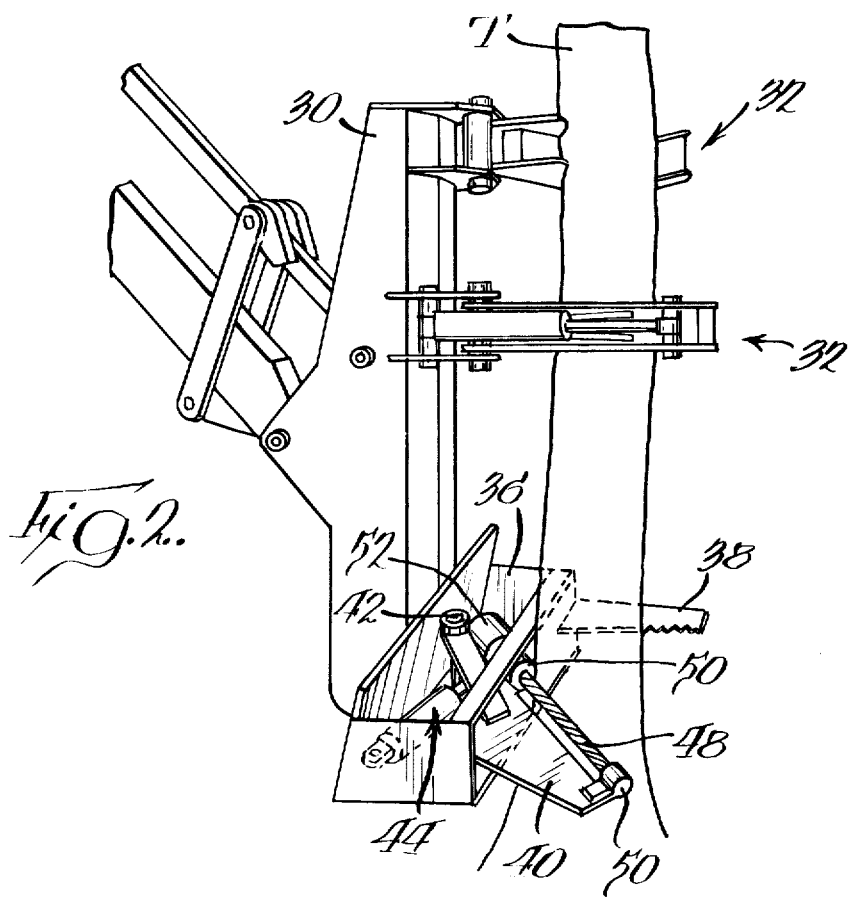

HYDRAULIC CIRCUIT FOR TREE HARVESTING IMPLEMENT

BACKGROUND OF THE INVENTION

This invention relates generally to apparatus for felling trees and more particularly to an improved hydraulic circuit for controlling the movement of a cutter that forms part of the tree harvesting apparatus.

In recent years, considerable attention has been devoted to production of machines for the logging industry which can grasp the tree and sever the tree close to the ground. One type of such machine is disclosed in U.S. Pat. No. 3,575,222, which is assigned to the assignee of the present invention. In this type of machine, the severing is performed by a pair of blades that are moved by a single fluid ram. This particular machine is extremely useful under certain tree harvesting conditions and has found a remarkable degree of commercial success in certain areas of the world. However, under certain conditions, the shear-type of cutter has been found to split or shatter the wood adjacent the cut. This problem is not of any significant concern when the trees are to be used to produce pulp but results in substantial waste when the trees are used for the production of lumber or veneer because the damaged wood must be trimmed before the tree is finally processed.

Quite recently, another type of tree harvesting apparatus has been developed which utilizes a rotary cutter that operates somewhat like an elongated milling cutter. U.S. Pat. No. 3,902,538 and Canadian Pat. No. 960,549 disclose this type of cutter which can be advanced through a tree to cut chips from across the grain without crushing or splitting the fibers.

The last mentioned United States patent also discloses a hydraulic circuit for controlling the pivotal movement of the cutter as a function of the rotational resistance encountered by the cutter. However, it has been found that the hydraulic circuit disclosed in this patent is extremely difficult to accurately adjust for the proper operating conditions. In the hydraulic circuit disclosed in this patent, the speed of movement of the frame supporting the cutter is controlled by a rack and gear type flow-control valve which is adapted to be opened and closed by a spring bias one-way cylinder and piston rod arrangement.

In the arrangement disclosed in the above mentioned patent, the flow-control valve must be accurately "matched" to the remainder of the system and the adjustment thereof is extremely critical in order to provide a satisfactory operation. Also, the connection between the hydraulic motor driving the cutter and the hydraulic circuit for the fluid ram moving the frame supporting the cutter is what is commonly referred to as a mechanical connection, which again requires accurate alignment and adjustment of the various parts.

Another problem encountered with the drive system disclosed in the above mentioned United States patent is the fact that it cannot provide maximum utilization of available horse power for all the resistances that may be encountered by the cutter. This means that the feed speed is slower than necessary under many cutting conditions.

SUMMARY OF THE INVENTION

According to the present invention, a hydraulic circuit has been developed for driving a cutter supported on a movable frame of a tree harvesting implement so that the movement of the frame is a function of the resistance encountered by the cutter as well as the resistance encountered by the frame supporting the cutter. All of this is accomplished by proper arrangement of "shelf" components in a hydraulic circuit.

More specifically, the hydraulic circuit of the present invention is incorporated into a harvesting implement having a cutter mounted on a movable frame with a hydraulic ram advancing and retracting the frame and a hydraulic motor driving the cutter. The hydraulic circuit includes first and second pressurized hydraulic fluid sources drawing fluid from a reservoir with conduit means respectively connecting the two sources to respective ends of the hydraulic ram and also connecting one of the sources to the hydraulic motor. The circuit also includes first and second relief valve means respectively located between opposite ends of the hydraulic ram and the reservoir so that the frame is moved as a function of the pressure of the hydraulic fluid in the respective fluid sources.

In the specific embodiment illustrated, one of the fluid sources is connected directly to the motor as well as the end of the fluid ram which has fluid supplied thereto to retract the movable frame while the other fluid source is connected to the end of the fluid ram that must be pressurized for advancing the movable frame.

With this arrangement, the movement of the cutter is a function of both the resistance encountered by the cutting operation as well as the resistance encountered by the frame which supports the cutter.

The hydraulic circuit also includes a portion of the circuit for retracting the fluid ram at the end of a cutting operation and both the advancing and retracting of the frame is accomplished through actuation of a single control lever. This circuit provides a common turning direction of the cutter at all times.

BRIEF DESCRIPTION OF THE SEVERAL VIEWS OF THE DRAWINGS

FIG. 1 of the drawings shows a perspective view of the tree harvesting apparatus which may have the present invention incorporated therein;

FIG. 2 is a fragmentary view of the harvesting apparatus shown in FIG. 1;

DETAILED DESCRIPTION

Figure 3:
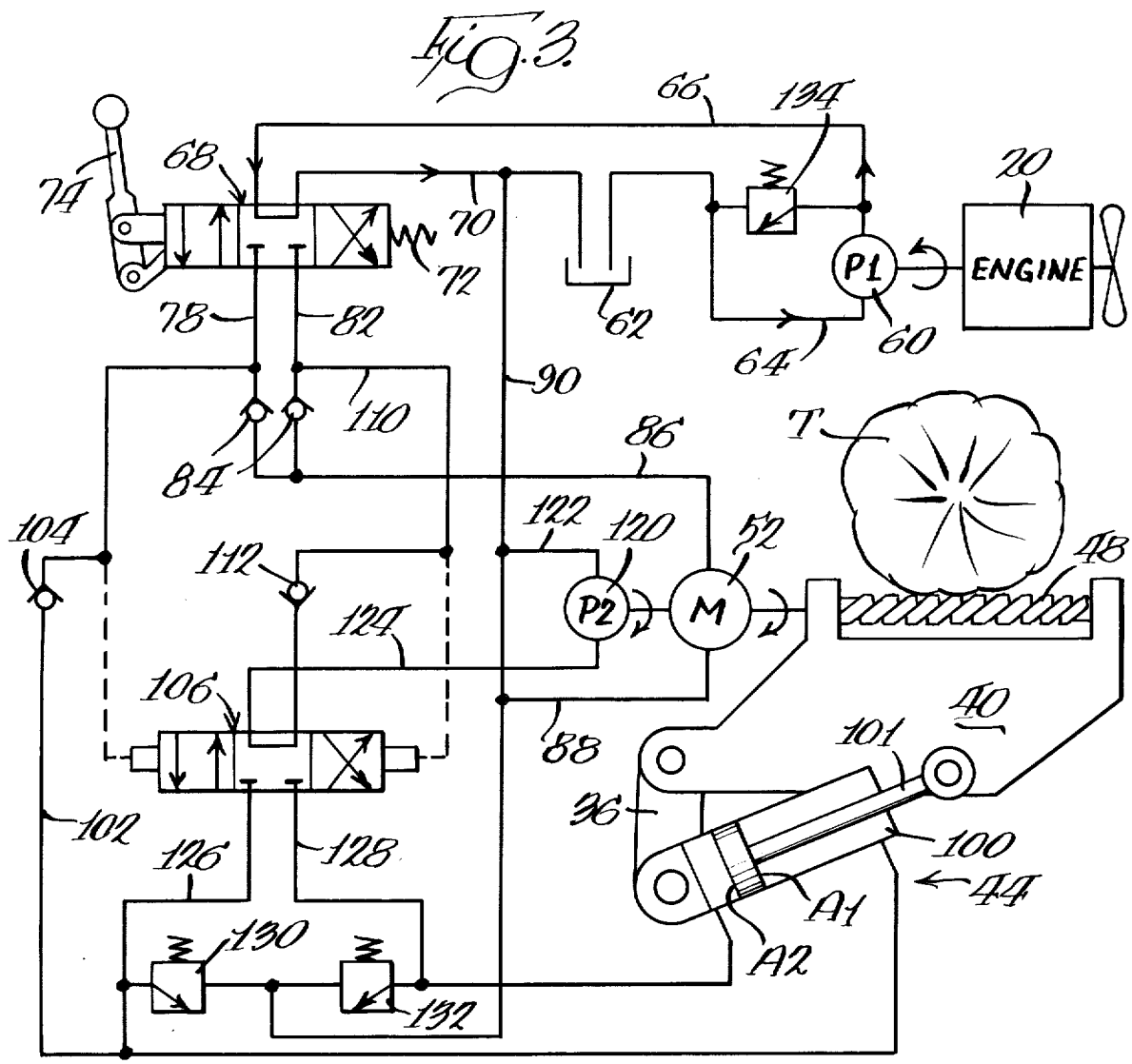
FIG. 3 is a schematic illustration of the hydraulic circuit of the present invention.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings generally discloses a tree harvesting apparatus, designated by the reference numeral 10. Harvesting apparatus 10 includes a mobile crane consisting of an undercarriage 12 having a pair of tracks 14 and supporting a turntable 16 for rotation about a vertical axis. Turntable 16 has a power plant or unit 20 supported thereon and an articulated boom 22 supported for pivotal movement about a horizontal pivot axis. The outer end of the articulated boom 22 has a tree harvesting or felling head 24 supported thereon for movement about a horizontal pivot axis 26 through a drive mechanism 28. Felling head 24 consists of a frame 30 having upper and lower grab arm assemblies 32 supported on an upper portion thereof and a cutter mechanism 34 supported on the lower portion thereof. The entire mechanism, with the exception of the cutter assembly is preferably of the type disclosed in U.S. Pat. No. 3,575,222, portions of which are not inconsistent with this disclosure are incorporated herein by reference. The cutter assembly has been illustrated as being of the type disclosed in U.S. Pat. No. 3,902,538, the portions of which are not inconsistent with this disclosure being incorporated herein by reference.

Cutter mechanism or assembly 34 includes a fixed frame portion 36 mounted on the lower end of frame 30 and having a backing element 38 extending therefrom. A movable frame 40 is pivotally supported about a vertical pivot pin 42 by a fluid ram 44. Movable frame 40 supports a cutter 48, which is illustrated as being a rotary cutter supported at opposite ends by brackets 50 on movable frame 40 and driven by a hydraulic motor 52.

With the assembly so far described, a tree T is selected for cutting and boom 22 and feller head 24 are manipulated so that the frame 30 is in the position illustrated in FIG. 2 with respect to tree T. Upper and lower grab arm assemblies 32 are then activated to grasp the tree between grab arm assemblies 32 and backing element 38 and the cutting operation is performed by applying hydraulic fluid to drive motor 52 as well as fluid ram 44 so that the cutter 48 is rotated and is simultaneously pivoted about pivot axis 42.

As was indicated above, in a system of the type described above, it is mandatory that the speed of movement of the movable frame or arm 40 be controlled because of the variable conditions that may affect the cutting operation. These variable conditions, among others, may include, the size or species of the tree, the binding of the cutter support arm with respect to the tree, obstructions encountered by the cutter support arm, and the condition of the cutter.

According to the present invention, the hydraulic circuit for supplying fluid to hydraulic motor 52 and fluid ram 44 is designed so that the cutter is operated at a substantially constant speed and the variables discussed above are compensated for by varying the feed speed of the cutter with respect to the felling head.

FIG. 3 of the drawings discloses the hydraulic circuit of the present invention for supplying pressurized hydraulic fluid to hydraulic fluid ram 44 and hydraulic fluid motor 52. The hydraulic circuit of the present invention is designed so as to be capable of automatically compensating for variables discussed above and the system can be activated by a single manual control lever. When the control lever is moved into a cutting condition, the cutting and feed systems are automatically powered and the feed speed is automatically adjusted to the variable cutting conditions.

As illustrated in FIG. 3, the hydraulic circuit for fluid ram 44 and motor 52 includes a first pump 60 driven by power unit 20 and connected to a reservoir 62 through a conduit 64. The output of pump 60 is delivered through conduit 66 to a three-position manually operated control valve 68 which is also connected to reservoir 62 through conduit 70. Valve 68 may be of the well known commercially available self-centering type which is biased to the illustrated neutral position by a spring 72 schematically illustrated in FIG. 3. Control valve 68 is moved in opposite directions from the neutral position by a single control lever 74, as will be described later.

Control valve 68 has two conduits 78 and 82 leading therefrom and both of these conduits are connected by unidirectional check valves 84 to the inlet for motor 52 by a conduit 86. The outlet for motor 52 is connected by branch conduit 88 to main return conduit 90 that returns to reservoir 62.

Conduit 78 is also connected to the rod end of cylinder 100 which has piston rod 101 reciprocated therein, through a conduit 102 having a unidirectional check valve 104 therein. Conduit 102 is also connected to one end of a three-position pressure responsive valve 106, for a purpose that will be described later. The second conduit 82 leading from control valve 68 is connected by a branch conduit 110 to one port of control valve 106 and conduit 110 has a unidirectional check valve 112 therein. Conduit 110 is also connected to the opposite end of pressure responsive valve 106.

The hydraulic circuit illustrated in FIG. 3 also includes a second pump or pressurized fluid source 120 which draws fluid from reservoir 62 through conduit 90 and branch conduit 122. The output of second pump 120 is connected through conduit 124 to a second port of pressure responsive valve 106. The respective outlet ports of pressure responsive valve 106 are connected to the opposite ends of cylinder 100 through conduits 126 and 128. Also, conduits 126 and 128 are respectively connected to main return conduit 90 through first and second relief valve means 130 and 132. An additional main relief valve 134 is located between the outlet of pump 60 to conduit 64 to protect the entire circuit from being overloaded.

Having now described all of the elements of the hydraulic circuit, the interrelationship and the function thereof will now be described utilizing terminology that is utilized in the claims appended hereto.

Figure 4:
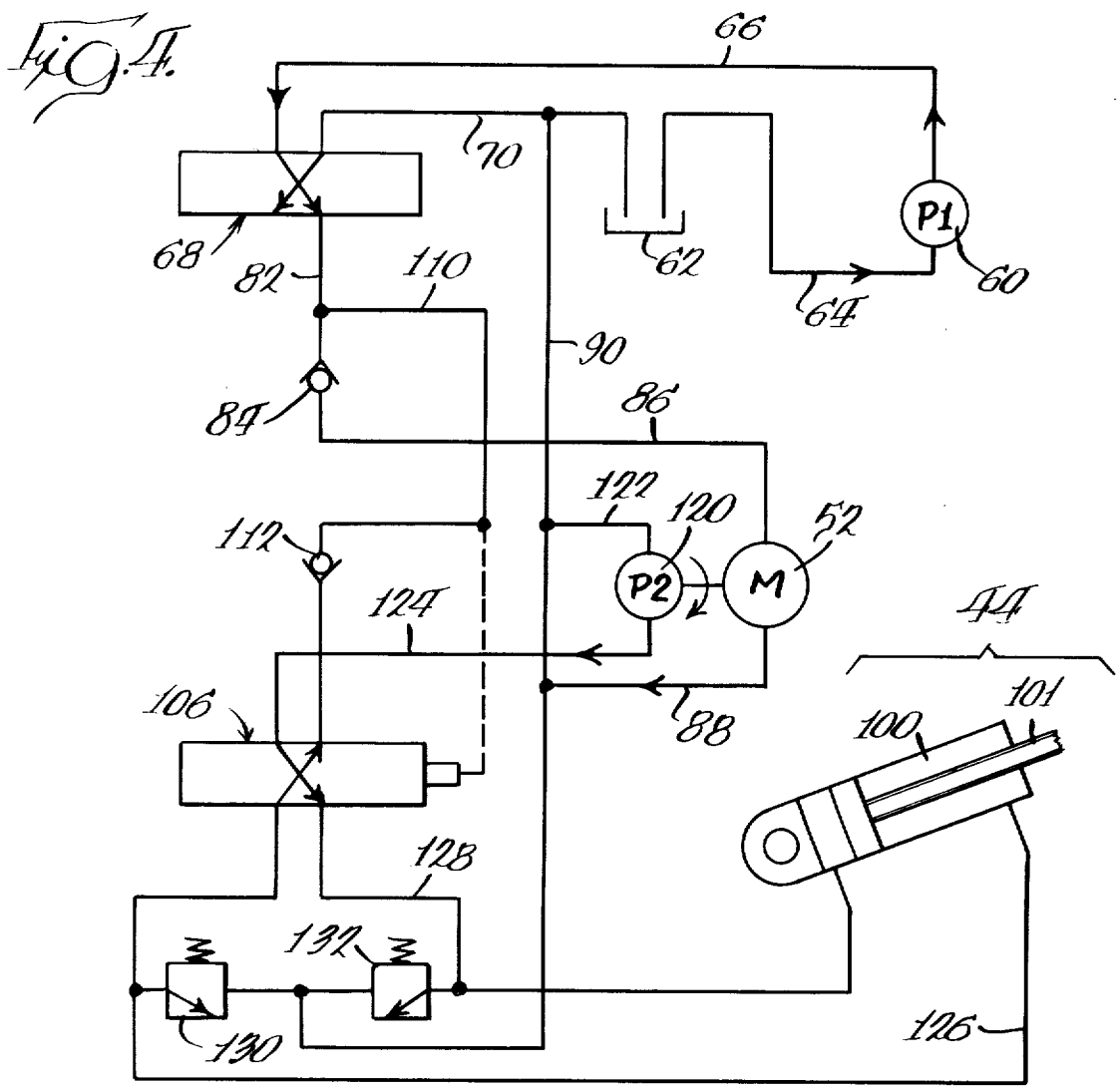
FIG. 4 is a partial schematic showing an operative portion of the circuit when cutting is being performed.

In order to simplify the understanding of the hydraulic circuit during the cutting phase of its operation, FIG. 4 has been added to show only the operative portions of the circuit necessary for driving the cutter and automatically controlling the movement of the cutter as a function of the variable conditions that might be encountered. This is accomplished by moving the single control lever for the entire circuit to the left as viewed in FIG. 3 to condition the control valve 68 in the position illustrated in FIG. 4. To hold the valve in the first operative position, the valve may have a detented holding mechanism.

In this position, pump 60, which is considered to be the first pressurized hydraulic fluid source, is connected to motor 52 and the head end of cylinder 100 by first conduit means consisting of conduits 66, 82, 86, 110 and 126. The pressure of the fluid in conduit 110 is also delivered to one end of pressure responsive valve 106 and moves the valve to the position illustrated in FIG. 4. The first conduit means is also connected to reservoir 62 through relief valve means 130 and conduit 90.

The second pressurized fluid source, pump 120, is connected to the opposite end of cylinder 100 through second conduit means consisting of conduits 124 and 128. The second conduit means is also connected to reservoir 62 through second relief valve means, relief valve 132, and conduit 90. By setting first relief valve means 130 at a pressure relief setting which is higher that second relief valve means 132, the extension of piston rod 101 with respect to cylinder 100 will automatically become a function of the resistance encountered by cutter 48 as well as movable frame or arm 40.

Assuming first a condition wherein no forces are encountered by the cutter blade or the movable arm all of the fluid from the first pressurized fluid source 60 will be delivered through motor 52 and be returned to reservoir 62 through conduits 88 and 90. Since there is no resistance to movement or cutter blade rotation at this time, the pressure of the fluid from pump 60 to motor 52 will be at a minimal value, substantially below the value of the pressure setting of relief valve means 130. Thus, hydraulic motor 52 will be operating at a maximum speed of rotation and will be driving pump 120, the second pressurized fluid source, at a maximum output. Since the output from pump 60 passes only through motor 52 and then is returned directly to reservoir 62, the motor 52 driving cutter 48 will at all times be operating at a constant speed.

During the above condition, with no resistance to cutter rotation or movement of arm 40, there will be a rapid increase of the pressure of the fluid in the rod end of cylinder 100 and, since the pressure in conduits 82 and 86, as well as conduit 110, is substantially lower than the pressure setting of relief valve 130, unidirectional check valve 112 will be opened and the fluid being forced from the rod end of cylinder 100 will pass through check valve 112 and conduit 110 and join the fluid being pumped by pump 60 to motor 52. During all this time, the second fluid source or pump 120 will have a maximum output which will be delivered through conduits 124 and 128 to the head end of cylinder 100 and move arm 40 at a maximum feed rate for the cutter 48.

Assuming now that the resistance to cutter rotation is increased, this increase will result in an increased pressure being developed in conduits 66, 82 and 86 as well as conduit 110. Once this pressure reaches the pressure level or setting for relief valve 130, there will no longer be sufficient pressure for the fluid in conduit 126 to open check valve 112. At this point in time, any fluid that is forced from the rod end of cylinder 100 opens relief valve 130 so that the fluid can be returned to reservoir 62 through conduit 90. Just prior to this condition, because relief valve 132 has a lower pressure setting than relief valve 130, relief valve 132 will open and allow some of the pressurized fluid from the second fluid source, pump 120, to be returned to reservoir 62 through conduit 90 thereby reducing the speed of movement of extension of piston rod 101 with respect to cylinder 100. During such action, relief valve 132 acts as a variable restrictor operating at a constant pressure level. Thus, any resistance encountered either by the forces required for rotating cutter 48 or pivoting arm 40 will result in reducing the amount of fluid that is supplied into the head end of cylinder 100. The ratio of the amount of fluid that is returned to reservoir 62 through relief valve 132 versus the amount of fluid that is delivered to the head end of cylinder 100, when the pressure of the fluid from pump 120 equals the pressure setting of relief valve 132, is schematically illustrated in the graph shown in FIG. 5.

The operation so far described is only related to the operation of the hydraulic circuit when control lever 84 is in a position corresponding to a position for advancing cutter 48. The hydraulic circuit illustrated in FIG. 3 also incorporates a further or third conduit means for retracting support arm 40, as well as cutter 48, which may be desirable for several reasons.

The retracting circuit portion of the hydraulic circuit is illustrated in FIG. 3. If the operator wishes to reverse the direction of movement of arm 40, it is only necessary for him to move the control lever 74 to the right as viewed in FIG. 3 so that conduit 66 is connected to conduit 78 while conduit 82 is connected to reservoir 62 through conduit 70. In this condition, the third conduit means for retracting fluid ram 44 will consist of conduits 66, 78 and 102 leading to the rod end of cylinder 100.

When conduit 102 becomes pressurized, pressure responsive valve 106 is moved to the right as viewed in FIG. 3 so that the output of the second fluid source, pump 120, also supplies pressurized fluid to the rod end of cylinder 100 through conduit 126. At the same time, the head end of cylinder 100 is connected to reservoir 62 through conduits 128, 110, 82 and 70. The return fluid from the head end of cylinder 100 is substantially unrestricted, except for the pressure required to open unidirectional valve 112. Thus, it will be seen that the present circuit has an additional advantage of automatically supplying fluid from both pumps or pressurized fluid sources for more rapidly retracting the movable arm 40 and cutter blade 48 supported thereon.

The particular hydraulic circuitry as specifically disclosed and described has an additional advantage because pump 120 is mechanically connected to and directly driven from motor 52. This means that it is not necessary for an additional set of conduits leading from the engine compartment of the vehicle out to the lower end of the feller head. Of course, it will be appreciated that, if desired, both pumps P1 and P2 could readily be driven from a single power source, such as power unit 20. In such instances, it would be desirable to utilize a dual gear pump for the separate pressurized fluid sources.

It will also be appreciated that while a rotary cutter supported for rotation about a fixed axis on frame 40 has been shown, other types of cutters, such as chain cutters could be utilized and driven by motor 52.

While it is believed that the above description accurately and clearly sets forth the construction, function and operation of the novel hydraulic control circuit, a few examples will be provided utilizing a given system and assuming that there is a direct relationship between the cutter resistance and the pressure output from pump P1 wherein the pressure from pump P1 is 2,000 psi when the cutter resistance is 3,000 pounds with the following settings for the various pressures and flows:

P1 pump output is 100 gpm
Pump output from pump P2 is 10 gpm (when flow from P1 flows through motor 52)
Pressure setting for relief valve 134 is 2,100 psi
Pressure setting for relief valve 130 is 2,100 psi
Pressure setting for relief valve 132 is 2,000 psi
A1 (see FIG. 3) is 8.5 square inches
A2 (see FIG. 3) is 10 square inches With the above conditions, and ignoring hydraulic and mechanical inefficiencies, the following formula sets forth the relationships of the forces and pressures involved:

$$F1 + F2 = P2 \text{ (psi)} \times A2 - P1 \text{ (psi)} \times A1$$

EXAMPLE 1

Assuming that the cutter is approaching a tree and there is no obstruction or binding forces restricting the movement of frame 40, the maximum feed speed of approximately 11.33 gpm hydraulic flow (the increased flow resulting from fluid returned from the rod end of cylinder 100 to conduit 86 and motor 52) is delivered from pump 120 and enters the head end of cylinder 100 thereby moving movable frame 40 at a maximum speed rate. At the same time, cutter 48 will be rotated at a constant maximum rate and the pressures of the fluid in the first and second conduit means will be substantially zero (ignoring any frictional losses and nominal forces required to open the unidirectional check valves).

EXAMPLE 2

Assuming now that the cutter engages a tree and the cutting operation begins. As the resistance force for cutter rotation increases, the pressure of the fluid from pump P1 will also correspondingly increase until a point in time when the pressure from pump P1 reaches the relief valve setting (2,100 psi) of relief valve 130. At this time, unidirectional valve 112 will remain closed and the pressure of the fluid in the head end of cylinder 100 will be 2,100 psi and any fluid forced from the cylinder must pass through relief valve 130.

At some point prior to relief valve 130 opening, relief valve 132 (with a setting of 2,000 psi) will open and divert some of the fluid from pump 120 to reservoir 62. At this point in time, as indicated above, the resistance force encountered by cutter 48 has reached a force of 3,000 pounds (see graph, FIG. 6). Assuming now that the forces encountered by cutter 48 equals 3,000 pounds, relief valve will correspondingly open and divert a proportionate amount of flow from pump P2 to reservoir 62 and automatically reduce the feed rate or movement of cutter arm 40. Thus, the desired constant F1 of 3,000 pounds and P1 of 2,000 psi is maintained regardless of variable conditions encountered by the cutter 48.

EXAMPLE 3

Assuming now that in addition to the cutting resistance (F1) encountered by the cutter from the species and size of tree and sharpness of the cutter, or an external force is developed on the cutter arm, such as an obstruction or binding on the cutter arm. If the force required on the cutter arm to overcome these external forces and continue rotation of the cutter is assumed to be 10,650 pounds, the cutter will automatically be reduced in speed and a force of less than 3,000 pounds will be encountered as a resistance to cutter rotation. From the graph illustrated in FIG. 6, it will be seen that when the total resistance to the cutter rotation and arm movement is 10,650 pounds, F1 is 1,500 pounds and the pressure of pump P1 is 1,100 psi. Since the total external force of 10,650 pounds and the internal force P1 × A1 is acting to compress the fluid in the head end of cylinder 100, the pressure of the fluid will rapidly increase to a pressure beyond the setting of relief valve 132, and the relief valve will partially open to reduce the feed rate for cutter 48. The amount of fluid diverted is shown in the graph of FIG. 5.

Figure 5:
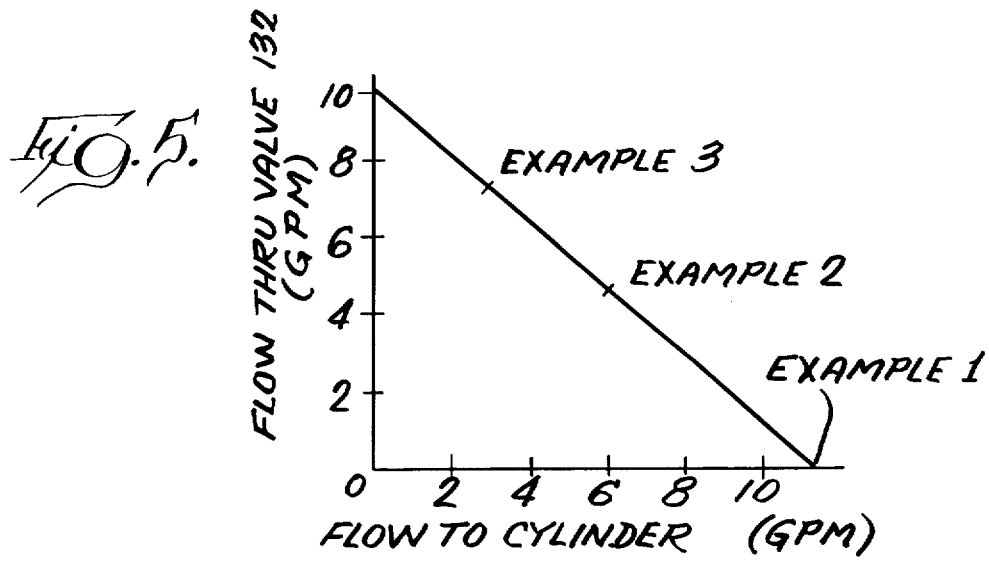
FIG. 5 is a graph showing the relationship of the flow to the fluid ram and through the associated relief valve for different pressure conditions.
Figure 6:
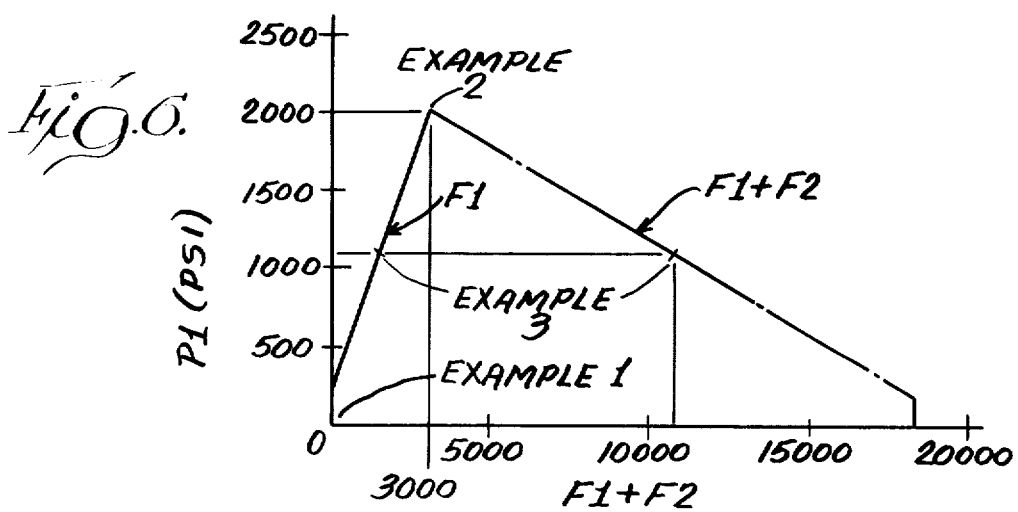
FIG. 6 is a graph showing the relationship of the forces acting on the cutter and frame and the pressure of the fluid from one fluid source.

While a specific example has been illustrated, the system could readily be changed by changing the size, relief valve settings, cylinder component sizes etc. and a different set of curves would be developed for the curves illustrated in FIGS. 5 and 6.

As can be seen from the above description, the present invention provides a simple and unique hydraulic circuit for automatically moving a cutter and maintaining the cutter speed at a substantially constant rate while utilizing only a single control lever for the automatic control function.

What is claimed is:

1. In combination with a tree harvesting implement having a cutter (48) mounted on a movable frame (40) with a hydraulic ram (44) advancing said frame, a hydraulic motor (52) driving said cutter and a hydraulic circuit for supplying hydraulic fluid to said ram and motor, the improvement of said hydraulic circuit including a reservoir (62), a first pressurized hydraulic fluid source (60) connected to said reservoir, a second pressurized fluid source including a pump 120 driven by said motor and connected to said reservoir, first conduit means (66, 82, 86, 110, 126) connecting said first fluid source to said motor and with one end of said fluid ram, said first conduit means having unidirectional valve means (112) preventing flow from said first fluid source to said one end of said fluid ram, second conduit means (124, 128) connecting said second fluid source to an opposite end of said fluid ram, first relief valve means (130, 134) in said first conduit means, second relief valve means (132) in said second conduit means, said first relief valve means having a pressure setting that is higher than the pressure setting of said second relief valve means so that the movement of said frame is a function of cutter resistance, and return conduit means (88, 90) connecting said first and second relief valve means and said motor to said reservoir.

2. A harvesting implement as defined in claim 1, in which said first conduit means includes a first conduit (66, 82, 86) leading from said first fluid source to said hydraulic motor and a branch conduit (110, 126) leading from said first conduit to said one end of said ram with said first relief valve means including a first relief valve between said branch conduit and said reservoir.

3. A harvesting implement as defined in claim 2, in which said first relief valve means further includes a second relief valve (134) between said first conduit (66) and said reservoir.

4. A tree harvesting implement as defined in claim 2, further including a manually actuated control valve (68) in said first conduit and a pressure responsive valve (106) in said branch conduit and said second conduit means so that the circuit can be actuated by a single control lever moving said control valve to a first operative position.

5. A tree harvesting implement as defined in claim 4, in which said manually actuated control valve has a second operative position with further conduit means (102) connecting said control valve directly to said one end of said hydraulic ram, said further conduit means being connected to said pressure responsive valve to position said pressure responsive valve for connecting said second conduit means to said one end of said hydraulic ram so that both sources supply fluid to said one end of said fluid ram for retracting said frame.

6. In combination with a tree harvesting implement having a cutter (48) supported on a frame (40) pivoted about a fixed pivot axis by a hydraulic ram (44) in a cutter advancing direction, a hydraulic motor (52) driving said cutter, and a hydraulic circuit for supplying fluid to said ram and motor, the improvement of said circuit comprising, a reservoir (62), a first pressurized hydraulic fluid source (60), a manually actuated valve (68) movable to first and second operative positions from a neutral position with said reservoir and first fluid source connected to said manually actuated valve, a pressure responsive valve (106) having a neutral position and first and second actuated positions, first conduit means (82, 86, 110, 126) connecting a first outlet port of said manually actuated valve to said motor, one end of said ram, and one end of said pressure responsive valve with said pressure responsive valve being in said first conduit means between said manually actuated valve and said ram, said first conduit means having a unidirectional check valve means therein a second pressurized fluid source (120) connected to said reservoir with second conduit means (124, 128) connecting said second source to an opposite end of said ram with said pressure responsive valve in said second conduit means, and first and second pressure responsive relief valve means (130, 132) respectively between said first and second conduit means and said reservoir so that actuation of said manually actuated valve to a first operative position will move said pressure responsive valve to the first actuated position and connect said first fluid source to said motor and with said one end of said ram while connecting said second fluid source to said opposite end of said ram.

7. A tree harvesting implement as defined in claim 6, further including third conduit means (102) directly connecting a second outlet port of said manually actuated valve to said one end of said fluid ram and an opposite end of said pressure responsive valve so that actuation of said manually actuated valve to the second operative position will connect both fluid sources to said one end of said ram and connect said opposite end directly to said reservoir.

8. A tree harvesting implement as defined in claim 7, in which said second fluid source includes a pump driven by said motor with a branch conduit connecting said third conduit means to said first conduit means so that said motor is connected to said first fluid source in either operative position.

9. A tree harvesting implement as defined in claim 8, in which said first conduit means has a unidirectional valve (112) therein that accommodates flow from said one end of said ram to said motor when the pressure of the fluid from said first fluid source is below the pressure setting of said first relief valve means while preventing flow from said first fluid source to said one end of said ram.

10. In combination with a tree harvesting implement having a cutter (48) mounted on a movable frame (40) with a hydraulic ram (44) moving said frame, a hydraulic motor (52) driving said cutter and a hydraulic circuit for said ram and motor, the improvement of said hydraulic circuit including a reservoir (62), first and second pressurized hydraulic fluid sources (60, 120), a manually actuated control valve (68) having a neutral position and first and second operative positions with conduits (66, 70) respectively connecting said source and reservoir to said valve, first conduit means (82, 86, 110, 126) connecting said first pressurized hydraulic fluid source to said motor (52) and with one end of said fluid ram, second conduit means (124, 128) connecting said second pressurized hydraulic source to an opposite end of said fluid ram, a first unidirectional valve in said first conduit means preventing flow from said first pressurized hydraulic fluid source to said one end of said fluid ram, first relief valve means (130) in said first conduit means, second relief valve means (132) in said second conduit means, return conduit means (90) connecting said first and second relief valve means to said reservoir, said first relief valve means having a pressure setting higher than said second relief valve means so that said frame is moved as a function of the pressure of the hydraulic fluid from the respective fluid sources when said control valve is moved to said first operative position.

11. The combination as defined in claim 10, further including a pressure responsive valve (106) in said first conduit means between said manually actuated control valve and said first relief valve means and in said conduit means between said second pressurized hydraulic fluid source and said second relief valve means with one end of said pressure responsive valve connected to said first conduit means, third conduit means (102) connecting said manually actuated control valve to said one end of said fluid ram and to an opposite end of said pressure responsive valve, said third conduit means having a first unidirectional valve (104) preventing flow from said one end of said fluid ram so that movement of said manually actuated control valve to said second operative position will connect both pressurized hydraulic fluid sources to said one end of said fluid ram to retract said cutter.

* * * * *